Feb. 28, 1956  R. A. BRAUNBERGER  2,736,574
KING PIN LOCK FOR FIFTH WHEELS
Filed March 3, 1953  3 Sheets-Sheet 1

INVENTOR.
RAY A. BRAUNBERGER
BY
ATTORNEY

Feb. 28, 1956 R. A. BRAUNBERGER 2,736,574
KING PIN LOCK FOR FIFTH WHEELS
Filed March 3, 1953 3 Sheets-Sheet 2

INVENTOR.
RAY A. BRAUNBERGER
BY
Bruno C. Lechler
ATTORNEY

Feb. 28, 1956  R. A. BRAUNBERGER  2,736,574
KING PIN LOCK FOR FIFTH WHEELS
Filed March 3, 1953  3 Sheets-Sheet 3

*INVENTOR.*
RAY A. BRAUNBERGER
BY
ATTORNEY

United States Patent Office 2,736,574
Patented Feb. 28, 1956

2,736,574

KING PIN LOCK FOR FIFTH WHEELS

Ray A. Braunberger, Chicago, Ill.

Application March 3, 1953, Serial No. 340,098

10 Claims. (Cl. 280—434)

The invention relates to an improved lock that locks the king pin of a semi-trailer securely in place in the fifth wheel of the tractor safe against accidental release, while still affording a positive release that can be set before the tractor starts forward.

The invention also provides spring means that automatically moves a bolt to lock the king pin in place, means for withdrawing the locking means, and means, actuated by the king pin as it moves out of position in the fifth wheel after release, for automatically setting the spring so that it will be ready to lock some other king pin in position as the tractor moves the fifth wheel into position under some other semi-trailer without attention on the operator's part.

Thus the driver need only preset the locking device before he drives the tractor out from under a trailer. He need not give any further attention to the locking device as he backs the tractor under another semi-trailer. As soon as the tractor is in position under the second trailer, the lock will automatically latch that king pin in place in the fifth wheel.

The invention is distinguished from other devices of this type in that the spring-actuated bolt that holds the king pin in position in the fifth wheel can be held inoperative by either of two latches. The first latch becomes operative when the driver pulls back the release lever that draws the bolt back. Pulling back the lever stresses the spring and the latch holds the bolt out and keeps the spring stressed.

The second latch is actuated by the outgoing king pin. It releases the first latch and holds the bolt out until another king pin rides into position in the fifth wheel. Then this second king pin releases this second latch.

The invention is also distinguished from other devices of this type in that, once the spring has pulled the bolt into the position that locks the king pin in place, the bolt is held in that position by a positive lock that remains effective even if the spring should break. This positive lock can only be released by the driver.

Another novel feature is that the release of this lock does not require an extra operation on the driver's part: the same operation that withdraws the bolt also releases this positive bolt lock.

A further feature is that the king pin bears against a concave recessed portion of the bolt, giving a larger load-carrying area.

Still another feature is that all the many parts are directly supported on the single cast fifth wheel plate thus assuring great rigidity.

Figure 1:
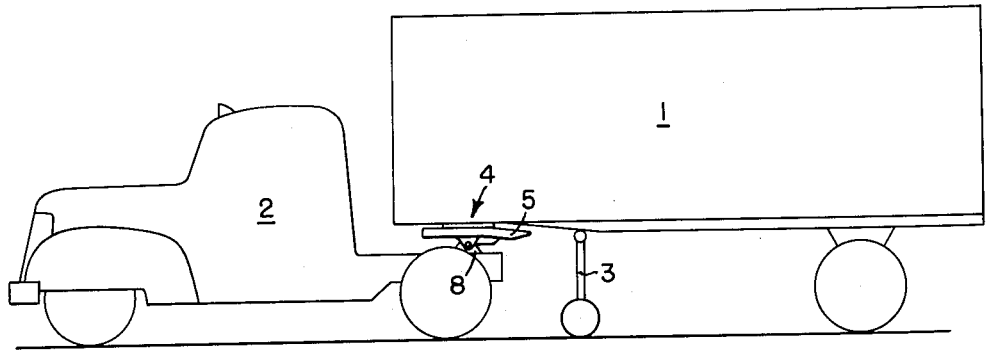
Fig. 1 shows in elevation a semi-trailer and a tractor connected by a king pin on the trailer entering a fifth wheel on the tractor.

Fig. 1 shows a semi-trailer 1 adapted to be drawn by a tractor 2. The forward end of the semi-trailer 1 may be supported on a hinged frame 3 when the trailer is uncoupled or, in transit, on the fifth wheel generally indicated at 4 and supported on a tractor.

Figure 2:
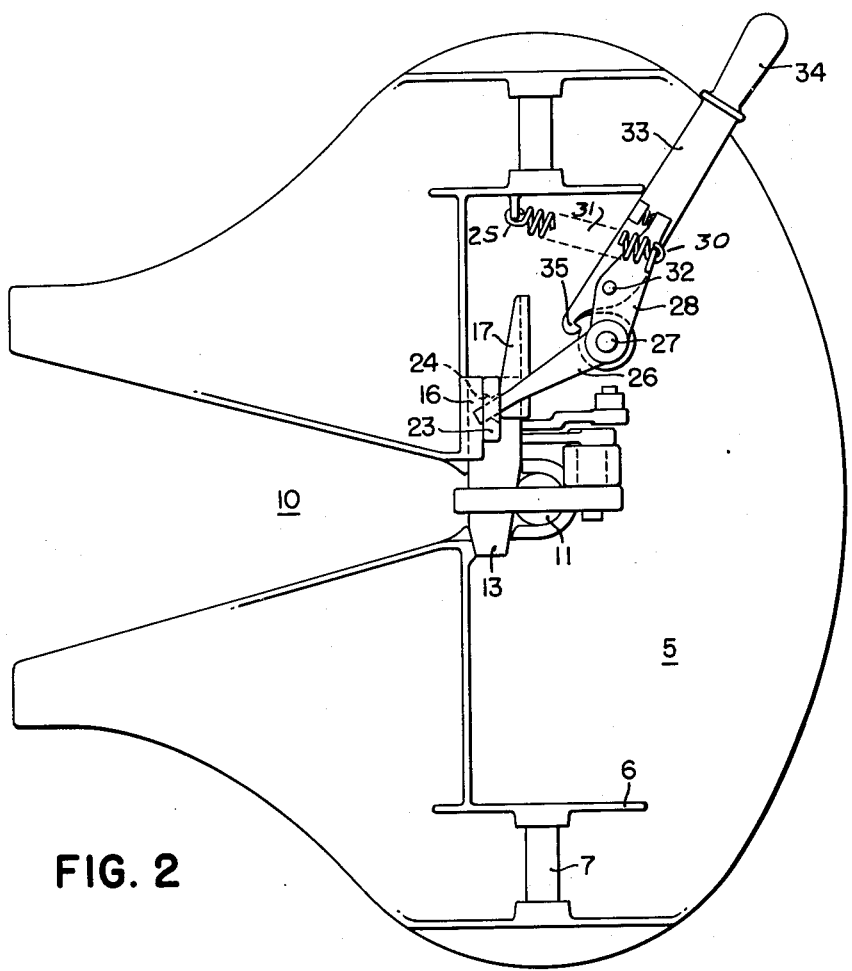
Fig. 2 is a bottom view of the plate of a fifth wheel, such as shown in Fig. 1, drawn to a larger scale and embodying the invention.

This fifth wheel has a top plate 5 shown in an enlarged scale in the bottom view Fig. 2.

Ribs 6, cast on the under side of the plate, carry bolts 7 allowing the top plate to tilt about the supports 8 attached to the tractor in Fig. 1. Such top plates have a tapered passage 10 which guides the king pin 11 into position as the tractor backs up to pick up the trailer. The entire tractive force is transmitted to the trailer through this king pin and the load of the forward end of the trailer rests on plate 12 which in turn rests on plate 5. As the truck makes a turn these plates slide over each other.

Figure 3:
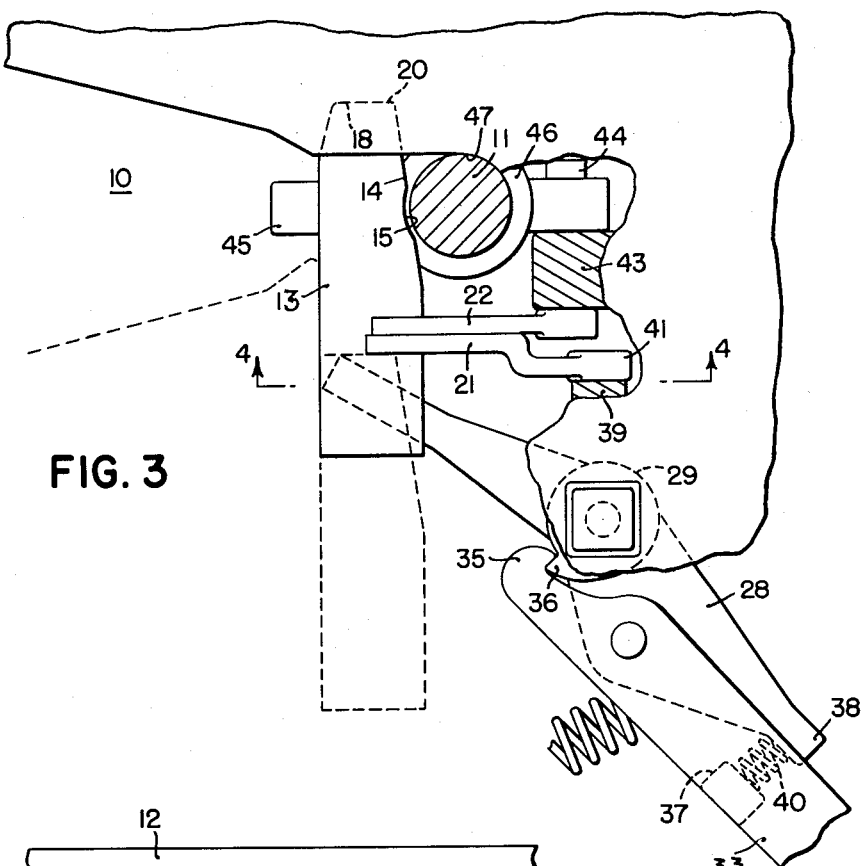
Fig. 3 is a partial sectional top view of the fifth wheel shown in Fig. 2.

The pull of the tractor is transmitted through bolts 7 to the fifth wheel plate and from the plate to the pin through a sliding bolt 13. As shown in Fig. 3, this bolt has a tapered edge 14 and this may have an arcuate recess 15 conforming to the curvature of the king pin 11. The opposite edge of the bolt 13 may also be tapered which will tend to move the bolt against the king pin after the pin is seated in the recess 18.

The bolt is guided by the flanges 16, 17, carried by the plate 5. It is free to move from the position shown in full lines in Fig. 3 with the forward end 18 supported in a pocket 20, to the dotted line position when edge 18 is back of the latches 21, 22, to be described later. The bolt 13 also carries a downward extending portion 23 shown in Fig. 2 that has a horizontal opening 24.

An arm 26 pivoted on the plate 5 at 27 extends into this horizontal opening 24. Through the arm 26 the bolt may be moved from the dotted to the full position in Fig. 3. Arm 26 forms part of a bell crank lever 28.

A tension spring 31 connected to the bell crank lever at 30 and to the plate 5 at 25 tends to draw the bell crank lever counterclockwise in Fig. 2, thus tending to hold bolt 13 in its locked position.

The bell crank 28 also carries a pivot 32. Lever 33 is mounted on this pivot. The lever 33 carries handle 34 and has a tip 35 that engages an abutment 36 carried by the plate 5. Two abutments 37, 38, are provided on the lever 33 and the bell crank 28 respectively, and a compression spring 40 tends to separate these abutments.

A boss 29 is cast on the plate 5 and this boss has an abutment 36.

This compression spring 40 tends to drive the tip 35 over the abutment 36 when the bolt 13 is in the locked position as shown in Fig. 3. No jolt or breaking of the spring 32 can release the tip 35 from 36. Thus the bell crank 28 and the belt 13 are locked against accidental release.

The only way that the bolt 13 can be unlatched is by grasping handle 34, moving the handle against compression spring 40 to unlatch tip 35 and then continuing to move the bolt to the dotted line position in Fig. 3.

When the dotted line position is reached, latch 21 holds the bolt 13 in the open position. The tractor can now back away from the trailer. The latch 21 is pivoted at 41 on an abutment 39 carried by the plate 5.

It is desired to have the bolt 13 move to the full line position under the power of spring 31 as soon as the king pin 11 of a trailer enters the plate. To do this, the latch 21 is released as the king pin disengages the plate 5 and another latch 22, which can be released by an entering king pin 11, is substituted for latch 21.

This is accomplished as follows. An abutment 43 on piece 5 carries a shaft 44. Keyed to this shaft are latch 22 and claw 45.

Figure 4:
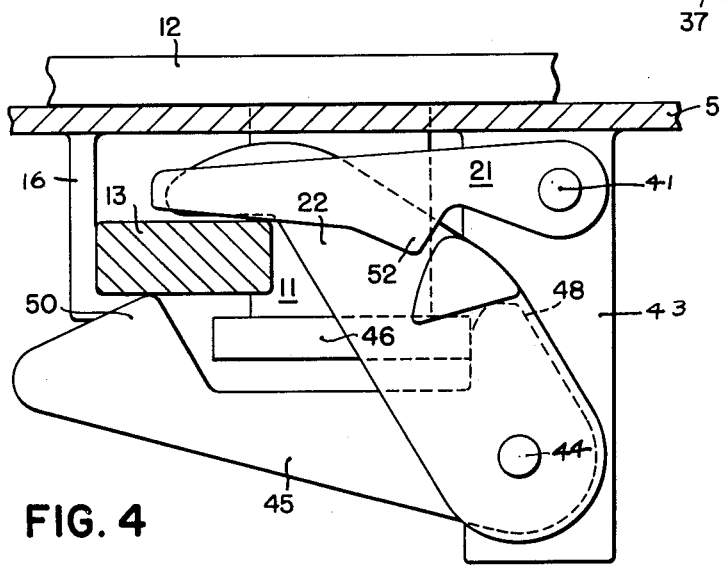
Fig. 4 is an elevation along line 4—4 in Fig. 3 showing the invention with the king pin of the trailer locked in place ready for the tractor to draw the semi-trailer.

As will appear from Fig. 4, the king pin usually carries a rim 46 which passes under a flange 47 that prevents a jolt causing a king pin locked in place horizontally from jumping out vertically.

Figure 5:
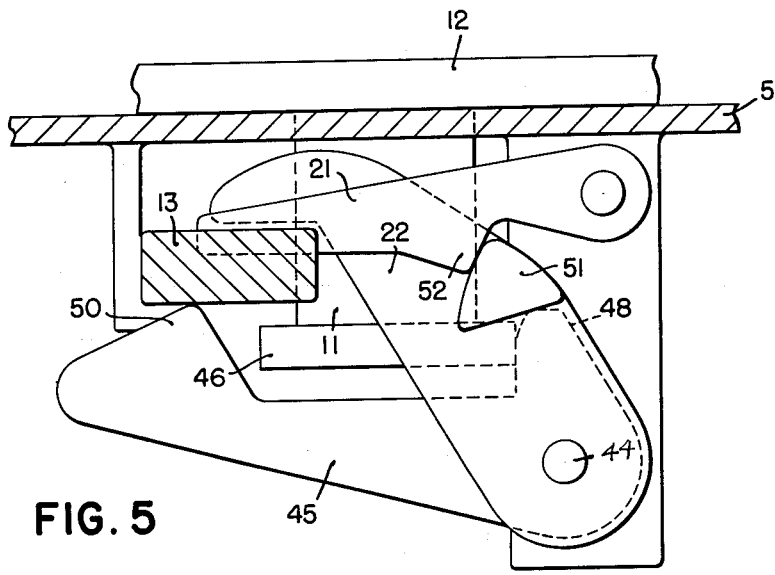
Fig. 5 is a vertical sectional elevation similar to Fig. 4 taken along line 4—4 with the latch held in the release position, ready for the semi-trailer to be released.
Figure 6:
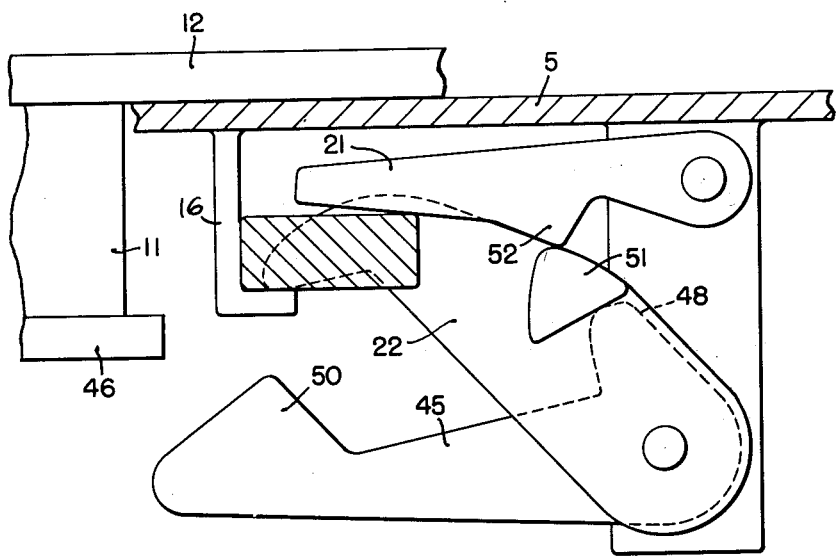
Fig. 6 is a vertical sectional elevation of a fifth wheel similar to Fig. 4 taken along the line 4—4 showing the latch cocked by the outgoing king pin and set to lock automatically when the fifth wheel is moved into position under another trailer carrying a king pin.

The claw 45 as seen in Figs. 2, 4, 5, has a raised stop arm 48 and an inclined raised portion 50. It will be noted that as the king pin 11 passes from the position which it occupies when the trailer is being coupled, as shown in Fig. 6, to the position of Fig. 5 where the flange 46 engages stop arm 48 of the claw 45, the claw is turned about the shaft 44 clockwise as seen in Figs. 5 and 6. When the trailer is to be uncoupled, the king pin moves from the position of Fig. 5 to that of Fig. 6 turning the shaft 44 counterclockwise as the flange 46 engages the raised portion 50 of the claw. The shaft 44 also carries latch 22 so that when the king pin is in place in the plate 5 for moving the trailer, 22 is elevated, but when the king pin has moved out as in Fig. 6, the latch 22 is lowered and keeps the bolt in the disconnected position.

When the latch 22 moves from the position shown in Fig. 5 to that shown in Fig. 6, the latch 21 is released automatically. This is done by the cam 51 which engages the cam 52 on latch 21.

As soon as the latch 21 is elevated from the position in Fig. 5 to that of Fig. 4, the spring 31 draws the bell crank 28 to move arm 26, and finally the bolt 13, until it bears against latch 22. When the king pin moves from Fig. 6 to Fig. 4 the latch 21 remains on top of the bolt and the latch 22 is lifted, thus allowing the spring 31 to draw the bell crank lever 28 over until the bolt 13 assumes the full line position in Fig. 3 and the tip 35 engages the abutment 36.

When the tractor is drawing a trailer, the king pin is bearing against the bolt 13 and the bell crank 28 is prevented from turning, because tip 35 of handle 34 engages abutment 36.

When the trailer is to be released, the tractor stops, the driver dismounts and moves handle 34. The first thing this does is to release the tip 35 from the abutment, the second thing is to turn the bell crank and draw out the bolt 13. When the bolt 13 has been completely withdrawn the latch 21 engages the tip of the bolt. The driver now remounts the tractor and starts forward. As he does so the king pin, moving out of the fifth wheel plate, releases latch 21 and substitutes latch 22.

The driver now backs under another trailer without having to dismount, and as he backs into place this king pin of this second trailer, when it has reached its position in the center of the fifth wheel, releases the latch 22. This allows the spring to move the bell crank, to move the bolt to locked position, and the tip 35 to re-engage abutment 36.

I claim:

1. A coupling between a semi-trailer and a tractor comprising, a king pin extending downward from the bottom of the trailer, a fifth wheel carried by the tractor having a slot into which the king pin may enter, a bolt adapted in its operative position to prevent the king pin from leaving the said slot, a lever assembly including a hand lever carried by the fifth wheel that controls the movement of said bolt, an abutment engaged by the lever assembly when the hand lever has been moved far enough in one direction to move the bolt to operative position and which prevents the lever assembly from turning back under any force exerted on the bolt, means within the lever assembly which permit the assembly when the hand lever is moved in the reverse direction to both disengage from said abutment and to move said bolt toward inoperative position.

2. A coupling between a semi-trailer and a tractor comprising, a king pin extending downward from the bottom of the trailer, a fifth wheel carried by the tractor having a slot into which the king pin may enter, a bolt adapted in its operative position to prevent the king pin from leaving the said slot, a lever assembly including a hand lever carried by the fifth wheel that controls the movement of said bolt, a spring attached to the lever assembly and the fifth wheel that biases the lever assembly in one direction, an abutment engaged by the lever assembly when the hand lever has been moved far enough in one direction to move the bolt to operative position and which prevents the lever assembly from turning back under any force exerted on the bolt, means within the lever assembly which permit the assembly when the hand lever is moved in the reverse direction by hand to both disengage from said abutment and to move said bolt toward inoperative position to engage the means for locking the bolt in that position, means whereby the king pin entering the slot will automatically release the means locking the bolt in inoperative position, and a spring biasing the bolt toward operative position.

3. A coupling between a semi-trailer and a tractor comprising, a king pin extending downward from the bottom of the trailer, a fifth wheel carried by the tractor having a slot into which the king pin may enter, a bolt adapted in its operative position to prevent the king pin from leaving the said slot, means for locking the bolt in its operative position, means for locking the bolt in its inoperative position, a lever carried by the fifth wheel adapted by a single movement to release the lock holding the bolt in operative position and to move the bolt to inoperative position, a shaft some distance below the top of the fifth wheel, a pivoted element supported on said shaft and adapted to be tilted by the king pin as it moves out of the slot and to be restored when the king pin has fully re-entered the slot, an arm carried by said shaft which prevents the bolt from assuming its locked position when the element is in its tilted position, a second lever pivoted closer to the bottom of the fifth wheel plate also adapted to prevent the bolt assuming its locked position, cam surfaces on each of said levers whereby when the first lever is tilted into position to restrain the bolt the second lever is released.

4. A fifth wheel king-pin-lock comprising a cast fifth wheel plate having a tapering recess for a king pin to enter, a bearing for the king pin at the lower end of said recess, a bolt movable on guides cast on the underside of said plate to cut off the end of said recess and to hold the king pin in place therein, a bell crank pivoted on said plate for moving said bolt axially, a handle extending beyond the lateral rim of the fifth wheel for withdrawing said bolt, a spring attached to said plate and handle for moving handle and bell crank to push said bolt into locking position, a latch hinged on said plate engaging said bolt to hold it in unlocked position against the force of said spring, a second latch pivoted on the plate moved into position to hold said bolt in unlatched position by the passage of the king pin out of the recess in the plate, means carried by said second latch which disengages said first latch from the bolt.

5. A fifth wheel king-pin-lock comprising a cast fifth wheel plate having a tapering recess for a king pin to enter, a bearing for the king pin at the lower end of said recess, a bolt movable on guides cast on the underside of said plate to cut off the end of said recess and to hold the king pin in place therein, a bell crank pivoted on said plate for moving said bolt axially, a spring attached to said plate for moving the bell crank to push said bolt into locking position, an abutment on said plate, a catch carried by said bell crank adapted to engage said abutment when the bolt is in locked position, a handle extending beyond the lateral rim of the fifth wheel pivoted on said bell crank and adapted both to release the catch and to move the bolt to release the king pin.

6. A fifth wheel king-pin-lock having a recess extending in from one edge to the center of the plate, parallel guides cast on the underside of said plate, a bolt movable at right angles to said recess supported in said guides, a longitudinal section of the bolt extending down between the guides, a bell crank lever pivoted on the underside of the plate one arm of which extends through a slot in said downwardly-extending section of the bolt, a spring attached to the other arm of said bell crank and to the underside of said plate which draws the bolt toward locked position, a lever pivoted on said second arm of the bell crank, means biasing said lever to turn about said pivot on the bell crank in one direction, a stop on the underside of said plate so placed that the lever will engage the stop when the bolt is in position to cut off the recess preventing the bolt from moving toward the position opening said recess, a handle on said lever permitting it to be moved against said biasing means to disengage the lever from said stop and to move the bell crank.

7. In a fifth wheel having a bolt locked in position when engaging the king pin of a semi-trailer and a handle which will by a single motion both release said lock and move the bolt, in combination, a fifth wheel plate having a slot, a bolt which in its locked position extends across said slot preventing a king pin from leaving the slot, a bell crank pivot and a stop on the underside of the fifth wheel, a bell crank lever supported on said pivot and having a first arm engaging said bolt and a second arm carrying a second pivot and an abutment located beyond said second pivot, a tension spring attached to the fifth wheel plate drawing the bell crank into a position drawing the bolt to its locked position, a lever pivoted on the second pivot having a handle extending away from the first pivot and a shorter end extending beyond the second pivot about which the lever turns and having a projection adapted to pass behind said stop, a compression spring biasing the lever away from the abutment on the bell crank and moving said projection into position behind the stop so that a single movement of the handle will first turn the handle about the second pivot to release the projection from engagement with the stop and then bear against the abutment so that the handle and the bell crank move together to withdraw the bolt.

8. In a fifth wheel, a plate having a slot, a bolt adapted to cut off a portion of said slot after the king pin of a semi-trailer has moved in, a spring to move said bolt to cut-off position, a latch so positioned that it will move into a position preventing the return of the bolt after it has been manually withdrawn from its cut-off position, a second latch also adapted to prevent the return of the bolt which is moved into position by the movement of the king pin out of the slot, means actuated by the second latch as it moves into position to prevent the return of the bolt that disengages the first latch so that when a king pin reenters the slot and moves the second latch into disengaging position the spring may move the bolt to cut-off position.

9. Apparatus connecting a semi-trailer to a tractor that requires manual action to uncouple but automatically couples, comprising, a fifth wheel having a slot mounted on said trailer, a king pin projecting downward from a semi-trailer resting in the end of said slot, a track in said fifth wheel, a bolt sliding in said track, which in its operative position extends across said slot and prevents said king pin from leaving the slot, a spring biasing said bolt to its operative position, a first bar pivoted on said fifth wheel adapted to fall across the path of said bolt when the bolt has been moved to inoperative position thus preventing said spring from moving the bolt back to its operative position before the king pin has left the slot, an assembly pivoted on said fifth wheel which includes a finger contacting a king pin in said slot and a second bar adapted to fall into the path of the bolt only after the king pin has started to move out of the slot and which is lifted out of the path of the bolt when a king pin reenters the slot and engages said finger, means carried by the second bar which when the bar falls into position lifts the first bar out of the path of the bolt whereupon the spring moves said bolt toward its operative position against said second bar where it remains until a king pin reenters the slot and lifts the second bar out of the path of the bolt.

10. A fifth wheel having a king pin lock whose bolt may be locked in inoperative position and which will remain in that position after the king pin leaves the fifth wheel but which will automatically be moved to lock in a king pin that reenters the slot comprising, in combination, a fifth wheel casting having a slot, a king pin projecting downward from a semi-trailer that is adapted to enter and leave said slot, a bolt movable in said fifth wheel casting which in its operative position projects across said slot, means biasing said bolt toward its operative position, a first bar pivoted on the casting that is adapted to fall across the path of the bolt when the bolt has been drawn to its inoperative position preventing said biasing means from moving the bolt to operative position, an assembly pivoted on said fifth wheel which includes a finger contacting a king-pin in the slot and a second bar that is normally out of the path of the bolt but which is moved into that path at a point closer to the operative position than said first bar when the king pin moves out of the slot and moved out of that path when a king pin reenters the slot and engages said finger, means controlled by the movement of the second bar into said path that removes the first bar from the path of the bolt and allows the biasing means to move the bolt past the first bar against said second bar where the bolt remains until a king pin returns to the slot and moves the second bar out of the path of the bolt allowing the biasing means to move the bolt to locked position.

References Cited in the file of this patent

UNITED STATES PATENTS

| | | |
|---|---|---|
| 1,951,258 | Retzlaff et al. | Mar. 13, 1934 |
| 2,140,990 | Emrick | Dec. 20, 1938 |
| 2,142,748 | Fontaine | Jan. 3, 1939 |
| 2,431,779 | Stevens | Dec. 2, 1947 |
| 2,676,817 | White | Apr. 27, 1954 |

FOREIGN PATENTS

| | | |
|---|---|---|
| 497,287 | Belgium | Nov. 16, 1950 |